United States Patent [19]

Takayanagi et al.

[11] 4,433,117

[45] Feb. 21, 1984

[54] COPOLYESTERAMIDE AND PRODUCTION OF THE SAME

[75] Inventors: Motowo Takayanagi, Fukuoka; Yoshihumi Murata, Kurashiki, both of Japan

[73] Assignee: Kuraray Co., Ltd., Kurashiki, Japan

[21] Appl. No.: 473,226

[22] Filed: Mar. 8, 1983

[30] Foreign Application Priority Data

Mar. 23, 1982 [JP] Japan .................................. 57-46671
Mar. 23, 1982 [JP] Japan .................................. 57-46672
Jul. 14, 1982 [JP] Japan ................................. 57-123703

[51] Int. Cl.³ .................... C08F 283/04; C08G 69/48; C08G 73/16
[52] U.S. Cl. .................................. 525/425; 525/444; 528/289
[58] Field of Search ................. 525/425, 444; 528/289

[56] References Cited

U.S. PATENT DOCUMENTS 3,839,245 10/1974 Schlossman et al. ........... 525/425 X
3,849,514 11/1974 Gray et al. ........................... 525/425
4,115,475  9/1978 Foy et al. ............................. 525/425

*Primary Examiner*—Lucille M. Phynes
*Attorney, Agent, or Firm*—Barry Kramer

[57] ABSTRACT

A copolymer having high strength and high elastic modulus is produced by copolymerizing (a) a polyamide oligomer prepared from a piperazine compound and an aromatic dicarboxylic acid and (b) a polyalkylene terephthalate monomer or a prepolymer thereof. The copolymer is useful as a rubber reinforcing fiber, a magnetic tape base film, and a coating material.

25 Claims, 5 Drawing Figures

COPOLYESTERAMIDE AND PRODUCTION OF THE SAME

BACKGROUND OF THE INVENTION

1. Field of the Invention

The present invention relates to a new copolyesteramide and a process for producing the same. More particularly, it concerns with a copolyesteramide composed of polyamide blocks obtained from a piperazine compound and an aromatic dicarboxylic acid and polyalkylene terephthalate blocks.

2. Description of the Prior Art

Aromatic polyesters such as polyethylene terephthalate and polybutylene terephthalate which are obtained from terephthalic acid and an aliphatic diol have found uses as fibers, films, and a variety of moldings on account of their outstanding mechanical properties, heat resistance, and chemical resistance. They can be improved in strength and elastic modulus by uniaxial or biaxial orientation, particularly in the case of fibers and films of polyethylene terephthalate. However, there has arisen a demand for a new polyester having higher strength and elastic modulus for use as tire cord and magnetic tape. There is also a demand for polyethylene terephthalate and polybutylene terephthalate having a higher glass transistion temperature or a higher glass transition temperature range, which is one of the indexes that determine their dimensional stability and usable temperature range, particularly the temperature at which the moldings produced therefrom lose their rigidity.

In order to meet such requirements, there was proposed in Japanese Laid-open Patent No. 65747/1979 an improvement through the blending of a rigid polymer. The proposed invention is disadvantageous in that a typical rigid polymer such as poly(p-phenyleneterephthalamide) can be readily blended with nylon, but not with an aromatic polyester, because it has a very high melting point or does not melt and there is no common solvent for both of them.

There is proposed in Japanese Laid-open Patent Nos. 125271/1979 and 123621/1980 a polyester having the aromatic amide unit. This polyester, however, is not greatly improved because the amide unit is not repeated consecutively. It is difficult to blend a polyester with an aromatic polyamide because the former has usually a very high melting point or does not melt and there is no common solvent for both of them. It is also difficult to copolymerize such an aromatic polyamide and a polyester.

SUMMARY OF THE INVENTION

It is an object of this invention to provide an alkylene terephthalate having high strength and high elastic modulus.

It is another object of this invention to provide an alkylene terephthalate which is improved in the glass transition temperature or glass transition temperature range.

It is further another object of this invention to provide an alkylene terephthalate which is improved in moldability.

The polymer of this invention is a random block copolyesteramide comprising 0.05 to 20 wt% of polyamide blocks composed of amide units represented by the formula (I)

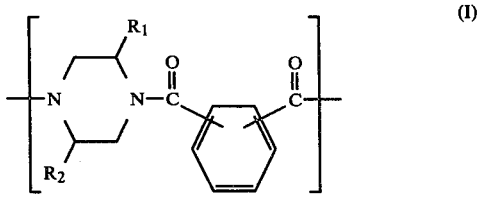

(where $R_1$ and $R_2$ are hydrogen or methyl groups) and 99.95 to 80 wt% of polyester blocks composed of ester units represented by the formula (II)

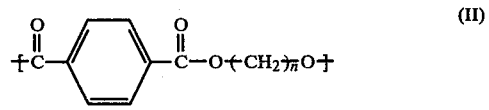

(where n is an integer of 2 to 4), said copolyesteramide having an intrinsic viscosity higher than 0.5, and the average number of the consecutive repeating amide units in said polyamide blocks being 2 to 40.

DETAILED DESCRIPTION OF THE INVENTION

Figure 1:
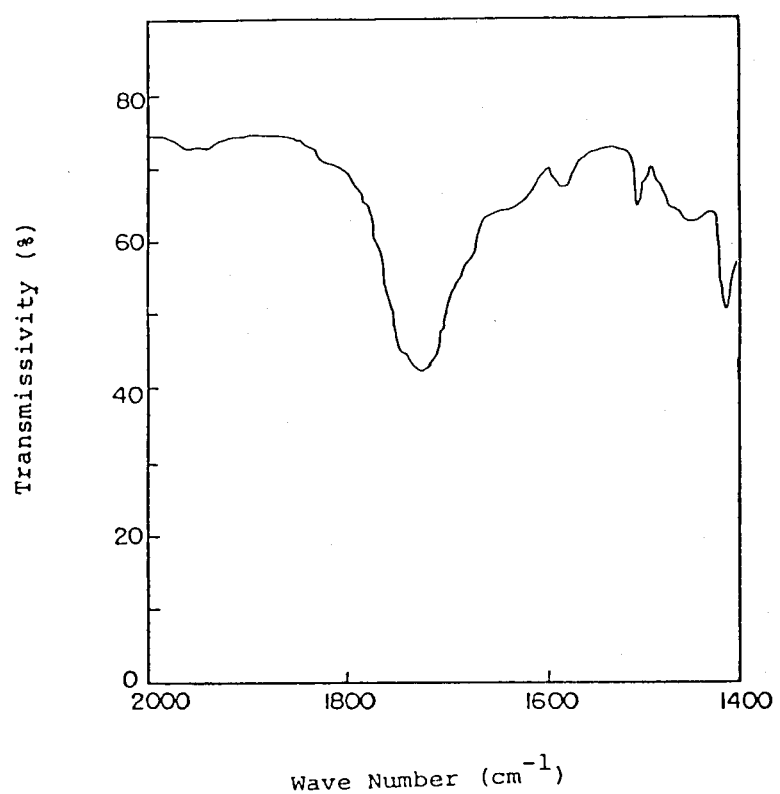
FIG. 1 is an infrared spectrum of the polymer obtained in Run 1 of Example 1.

The polyester blocks constituting the copolyesteramide of this invention are an aromatic polyester obtained from terephthalic acid or an ester-forming derivative thereof and a linear aliphatic diol of carbon number 2 to 4. It is any one of polyethylene terephthalate, polypropylene terephthalate, and polybutylene terephthalate. Preferable among them is polyethylene terephthalate which can be made into moldings of high strength and high elastic modulus. Such an aromatic polyester may be one with up to 20 mol% of the terephthalic acid and/or diol substituted with other dicarboxylic acids and/or diols. Examples of such dicarboxylic acids include isophthalic acid, orthophthalic acid, diphenyldicarboxylic acid, diphenoxyethane dicarboxylic acid, succinic acid, adipic acid, sebacic acid, and dodecanedioc acid. Examples of such diols include neopentyl glycol, 1,4-cyclohexanediol, 1,4-cyclohexanedimethanol, diethylene glycol, and polyethylene glycol.

According to this invention, the amide units constituting the polyamide block is one in which the dicarboxylic acid is isophthalic acid, orthophthalic acid, or terephthalic acid. The preferred amide unit is one in which at least 30 mol% of the dicarboxylic acid is composed of isophthalic acid and/or orthophthalic acid. Such amide units permit the copolymerization reaction to be performed easily as mentioned later.

The diamine component is piperazine or a ring-substituted derivative thereof such as methyl piperazine and trans-2,5-dimethyl piperazine. Up to 40 mol% of the dicarboxylic acid constituting the amide unit may be substituted with other dicarboxylic acids such as oxalic acid, succinic acid, and adipic acid. Up to 10 mol% of the diamine may be substituted with other diamines such as o-phenylenediamine, m-phenylenediamine, p-phenylenediamine, 2,4-toluenediamine, 2,6-toluenediamine, 3,4-toluenediamine, 1,5-naphthylenediamine, 1,8-naphthylenediamine, p,p'-diaminodiphenylmethane, 4,4'-diaminodiphenylether, 3,3'-diaminodiphenylsulfone, 4,4'-diaminodiphenylsulfone, isophthalic dihydrazide, terephthalic dihydrazide, and other aromatic diamines; 1,4-cyclohexanediamine and other alicyclic diamines; and hexamethylenediamine and other aliphatic diamines.

According to this invention, the polyamide block should be such that the average number of the repeating units therein is greater than 2. If the average number of the repeating units is less than 2, no satisfactory results are produced and there will not be obtained a copolymer having high strength and high elastic modulus. The upper limit of the average number is not specifically limited; but an average number greater than 40 is not preferable because the copolymerization with polyester becomes difficult. As to the polyester block, there is no specific limit in the average number of the repeating units; but 20 to 500 is preferable.

The copolyesteramide of this invention should be composed of 0.05 to 20 wt% of polyamide block and 99.95 to 80 wt% of polyester block. If the quantity of polyamide block is less than 0.05 wt%, no satisfactory results are produced. When it is greater than 0.05 wt%, the effect becomes remarkable. Above 0.1 wt%, the resulting copolymer is almost the same in strength and elastic modulus regardless of the ratio of copolymerization. It is a main feature of this invention that a marked effect is produced even with a small amount of polyamide block. If the polyamide block exceeds 20 wt%, the polycondensation reaction does not proceed smoothly and a copolymer of high degree of polymerization is not obtained. Consequently, the polyamide block in the copolymer should preferably be in the range of 0.05 to 20 wt%, more suitably 0.1 to 5 wt%, and most suitably 0.2 to 2 wt%.

The copolyesteramide of this invention should have an intrinsic viscosity higher than 0.5 measured in phenol/tetrachloroethane (1/1 by volume) at 25° C. If the intrinsic viscosity is lower than 0.5, the copolymer is not satisfactory in practical performance. The upper limit is not specifically set up; but a copolymer having an intrinsic viscosity higher than 2.0 is difficult to produce.

The copolyesteramide of this invention can be produced by dissolving polyamide oligomer having the repeating unit represented by the formula (I) and having an average degree of polymerization of 2 to 40,

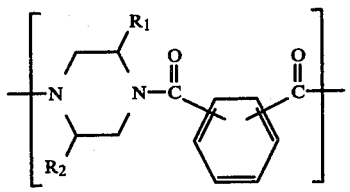
(I)

(where $R_1$ and $R_2$ are hydrogen or methyl group) in the polyester monomer or prepolymer thereof represented by the formula (III),

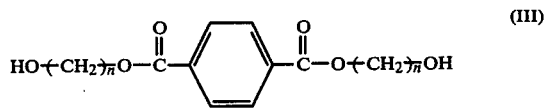
(III)

(where n is an integer of 2 to 4) and subsequently performing a polycondensation reaction. The polyester monomer or prepolymer thereof represented by the formula (III) can be produced by the esterification reaction or ester exchange reaction of terephthalic acid or an ester-forming derivative thereof and an aliphatic diol. The esterification reaction or ester exchange reaction can be performed under the conditions normally used for the production of polyester. The melt of the resulting polyester monomer or prepolymer thereof is capable of dissolving easily the polyamide oligomer on simple addition and mixing. The prepolymer is one having an intrinsic viscosity lower than 0.2. The polyester monomer or prepolymer thereof may contain terephthalic acid or an ester-forming derivative thereof or an aliphatic diol used as the raw materials.

The polyamide oligomer represented by the formula (I) should be end-blocked mostly (more than 90%) with carboxyl groups or ester-forming groups derived from carboxyl groups. This is preferable from the standpoint of reactivity and miscibility with the polyester monomer. The ester-forming groups derived from carboxyl groups include lower alkyl esters such as methyl ester, ethyl ester, and hydroxyethyl ester; and esters of phenol or phenol derivatives. In the case where more than 70 mol% of the dicarboxylic acid constituting the polyamide oligomer is terephthalic acid, it is necessary that at least 50% of the terminals of the molecular chains should have phenol derivative residues represented by the formula (IV) below. In addition, the polyamide oligomer should have an average degree of polymerization of 2 to 5.

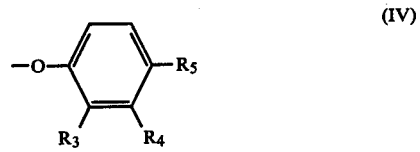
(IV)

(where either of $R_3$ or $R_4$ is an alkyl group of carbon number 3 to 5 and the other is hydrogen; and $R_5$ is hydrogen, lower alkyl group, or lower alkoxy group.)

If the above group is not connected to the end of the molecular chain, or if the quantity of the above group is less than 50%, copolymerization with polyester will be difficult. If the average degree of polymerization of the oligomer exceeds 5, copolymerization with polyester is difficult to perform by melt polycondensation. In such a case, it is necessary to employ the following special process. Namely, the polyamide oligomer is dissolved in a solvent such as dimethylacetamide, dimethylformamide, N-methylpyrrolidone, and hexamethylphosphoramide, and polyalkylene terephthalate or oligomer thereof is dissolved in a solvent such as dimethylsulfoxide. Both of the resulting solutions are mixed uniformly, and the mixture is mixed with a non-solvent such as water and alcohol so that the polyamide oligomer and the polyalkylene terephthalate or oligomer thereof precipitate in the form of uniform solid mixture. After separation of solvent, the precipitates undergo solid phase polycondensation to give a copolymer.

The group represented by the above formula (IV) should be such that either $R_3$ or $R_4$ attaching thereto is an alkyl group of carbon number 3 to 5. Such a substituting group improves the solubility of the polyamide oligomer and makes it soluble in polyester monomer. The alkyl group of carbon number 3 to 5 includes n-propyl, iso-propyl, n-butyl, iso-butyl, tert-butyl, n-pentyl, and iso-pentyl groups. Preferable among them is the tert-butyl group. $R_5$ is hydrogen, a lower alkyl group, or a lower alkoxyl group.

In the case where at least 30 mol% of the dicarboxylic acid constituting the polyamide oligomer is isophthalic acid and/or orthophthalic acid, the above-mentioned limit is not applied. It is satisfactory if the terminals of the molecular chain are mostly carboxyl groups or ester-forming groups derived from carboxyl groups. This is advantageous for the production of the copolymer.

The polycondensation reaction which is to be performed after the polyamide oligomer has been dissolved in polyester monomer or prepolymer thereof may be performed under the same conditions as for the normal polycondensation of polyesters. Namely, the polycondensation reaction is performed in vacuo at a temperature slightly higher than the melting point of the polyester in the presence of an antimony compound, a titanium compound, a germanium compound, or a zinc compound as a catalyst. The reaction may be combined with solid-state polymerization, if required.

The polycondensation reaction brings about polycondensation of polyester and condensation of polyester and polyamide oligomer, to give the polyesteramide block copolymer of this invention. The polyamide oligomer added is mostly copolymerized with polyester without being decomposed. Therefore, it is possible to prepare a copolymer of desired composition by adjusting the quantity of polyamide oligomer added.

Usually, the polyamide oligomer is added in an amount of 0.05 to 25 parts by weight for 100 parts by weight of polyester (the quantity of polyester to be obtained when polyester monomer alone is polymerized). The average number of consecutive repeating amide units in the polyamide block in the copolymer coincides approximately with the average degree of polymerization of the polyamide oligomer to be used.

The polyamide oligomer can be synthesized by mixing and reacting a chloride of an aromatic dicarboxylic acid selected from terephthalic acid, isophthalic acid, and orthophthalic acid, and piperazine or a ring-substituted derivative thereof. The reaction should be performed in a proper solvent such as methylene chloride, chloroform, dichloroethane, and other halogenated hydrocarbons; and benzene, n-hexane, dimethylacetamide, dimethylformamide, N-methylpyrrolidone, and hexamethylphosphoramide, and mixture thereof. These solvents should be incorporated with a tertiary amine such as triethylamine, tri-n-propylamine, tri-n-butylamine, N-ethylpiperidine, and N-ethylmorpholine so that the reaction proceeds smoothly. In addition, the reaction may be performed in the presence of a monovalent or divalent lower aliphatic alcohol, phenol, or monovalent or divalent phenol derivative, or in the presence of an aromatic dicarboxylic acid chloride monoester (preferably an ester of a monovalent or divalent lower aliphatic alcohol, phenol, or monovalent or divalent phenol derivative). This permits the production of polyamide oligomer having the terminal ester bond. Moreover, by selecting the quantity properly, it is possible to adjust the degree of polymerization of the polyamide oligomer.

In the case where more than 70 mol% of the dicarboxylic acid in the polyamide oligomer is terephthalic acid, it is necessary to use a phenol derivative of the formula:

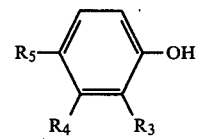

or a monoester of said derivative and terephthaloyl chloride, so that the group represented by the above formula (IV) is connected to more than 50% of the terminals of the molecular chains of the polyamide oligomer.

The reaction to form the polyamide oligomer proceeds as soon as the raw materials are mixed. The reaction temperature should preferably be lower than room temperature, and more suitably about 0° C.

The above-mentioned aromatic dicarboxylic acid chloride monoester is prepared by reacting an aromatic dicarboxylic acid chloride and an alcohol or phenol. To carry out the esterification reaction smoothly, it is recommended to add a tertiary amine such as triethylamine, tri-n-propylamine, tri-n-butylamine, N-ethylpiperidine, and N-ethylmorpholine. The resulting aromatic dicarboxylic acid chloride monoester may be used as such or after purification. If an aromatic dicarboxylic acid chloride is added to the reaction product or added in excess previously to the reaction system, it can be readily used for the reaction with piperadine or a ring-substituted derivative thereof.

The aromatic dicarboxylic acid chloride monoester should preferably be used in an amount of 0.1 to 2.0 mol for 1 mol of the aromatic dicarboxylic acid chloride. Generally speaking, the more the aromatic dicarboxylic acid chloride monoester is used, the lower is the degree of polymerization of the polyamide oligomer. Conversely, the less the aromatic dicarboxylic acid chloride monoester is used, the higher is the degree of polymerization of the polyamide oligomer. Since the reaction proceeds almost stoichiometrically, the aromatic dicarboxylic acid chloride and piperadine or ring-substituted derivative thereof should preferably be used in such amounts that —COCl group and amino group are equal in the entire reaction system including the aromatic dicarboxylic acid chloride.

Whether the reaction of polyester and polyamide oligomer has formed the intended polyesteramide block copolymer may be confirmed by the following method. Namely, the resulting polymer is dissolved in a mixed solvent of phenol/tetrachloroethane, and then n-heptane, which is a non-solvent for the polymer, is added until the solution becomes apparently cloudy. The solution is then centrifuged to separate it into two layers. The lower thick layer is discharged and placed in a large quantity of methanol to precipitate polymer. This operation removes unreacted polyamide oligomer. The precipitated polymer is subjected to infrared spectrometry. Absorption at 1630 cm$^{-1}$, which is due to the C=O stretching vibration of piperadineamide, indicates the presence of polyamide.

The composition of the copolymer can be determined according to the nitrogen content obtained by elemental analysis. The average number of consecutive repeating amide units can be predicted indirectly from the degree of polymerization of the polyamide oligomer used as a raw material. It can also be obtained directly by a high-resolution NMR spectrum. That the amide units are copolymerized in the form of blocks in the polymer is confirmed by the fact that the melting point decreases very little as the result of copolymerization and that the phase-separated configuration is observed in the polymer melt under a microscope.

The copolyesteramide of this invention is superior in strength and elastic modulus to the conventional polyester. It is surprising to note that this effect is not produced if poly(p-phenyleneterephthalamide) is used as the polyamide oligomer. In addition, it is not readily copolymerized with polyester by melt polycondensation, due to its poor solubility in polyester. The outstanding effect of this invention is produced when a specific polyamide oligomer is used.

The copolyesteramide of this invention can be formed into fibers, films, blocks, and other any shapes using the molding method and apparatus commonly used for the conventional polyester. In addition, it can be incorporated with various additives, fillers, reinforcements, colorants, releasing agents, antioxidants, UV stabilizers, flame retardants, etc. which are commonly used for the conventional polyester moldings. Examples of such fillers and reinforcements include talc, clay, kaolin, mica, asbestos, wollastonite, calcium silicate, silica, gypsum, graphite, glass fiber, carbon fiber, graphite fiber, metal carbide fiber, metal nitride fiber, Aramide fiber, and phenolic resin fiber.

The copolyesteramide of this invention may be mixed with an aromatic polyester such as polyethylene terephthalate and polybutylene terephthalate containing no amide group, without impairing the effect of this invention. In this case, the aromatic polyester is used in an amount of 0.1 to 100 parts by weight for 1 part by weight of the copolyesteramide, preferably in such an amount that the polyamide block accounts for 0.05 to 20 wt% in the total resin weight.

The copolyesteramide of this invention and the aromatic polyester containing the copolyesteramide of this invention can be formed into fibers by melt spinning, followed by stretching and heat treatment, under the same conditions as used for the production of conventional polyester fibers. The fibers thus produced are suitable for rubber reinforcement such as tire cord because of their higher glass transition point than the conventional polyester fibers.

The copolyesteramide of this invention and the aromatic polyester containing the copolyesteramide of this invention can be formed into oriented films by melt extrusion, followed by stretching and heat treatment. The films thus produced are suitable for magnetic tape bases because of their high strength and high elastic modulus.

The copolymer of this invention is also suitable as a coating material because of the outstanding adhesion to substrate, flexibility, flexing properties, surface hardness, and heat resistance. It will find use in application areas such as precoating metal and wire covering where the coating is subjected to mechanical deformation and high temperature. Such coating materials can be used in the form of solution, melt, slurry, powder, or film. The coating materials can be applied to substrates of any configuration (plate, column, cylinder, wire, etc.) and material (metals and plastics). The coating film is suitably 0.01 to 5 mm thick.

The invention is now described in more detail with reference to the following examples. These examples, however, are intended to illustrate the invention and are not to be construed to limit the scope of the invention.

REFERENTIAL EXAMPLES

Preparation of Polyamide Oligomer and Polyester Monomer

Referential Example 1

Synthesis of Polyamide Oligomer (1)

In a 300-ml four-neck flask equipped with a dropping funnel, nitrogen gas inlet, reflux condenser, and stirrer was placed 150 ml of methylene chloride. In the methylene chloride were dissolved 0.048 mol of anhydrous piperazine, 0.012 mol of catechol, and 10 ml of triethylamine in a nitrogen stream at room temperature. 50 ml of methylene chloride solution containing 0.030 mol of terephthaloyl chloride and 0.030 mol of isophthaloyl chloride was added dropwise to the flask over 30 minutes at room temperature. The reaction was carried out at room temperature for 30 minutes.

The methylene chloride was distilled away, and the resulting residue was washed thoroughly with water and dried in vacuo to give polyamide oligomer (1).

This polyamide oligomer was found to have an average degree of polymerization n=3.0 by proton NMR spectrum in which the absorption of phenyl proton adjacent to the carboxylic acid or carboxylic ester that appears in the neighborhood of $\delta=8.0$ ppm was compared with the absorption of other phenyl protons that appears in the region of $\delta=7.0$ ppm to $\delta=8.0$ ppm.

Referential Example 2

Synthesis of Polyamide Oligomer (2)

Using the same apparatus as used in Referential Example 1, in 150 ml of methylene chloride were dissolved 0.048 mol of anhydrous trans-2,5-dimethylpiperazine, 0.012 mol of phenol, and 10 ml of triethylamine. 50 ml of methylene chloride solution containing 0.030 mol of terephthaloyl chloride and 0.030 mol of isophthaloyl chloride was added dropwise over 30 minutes at room temperature. The reaction was carried out at room temperature for 30 minutes. The methylene chloride was distilled away, and the resulting residue was washed thoroughly with water and dried in vacuo to give polyamide oligomer (2).

This polyamide oligomer was found to have an average degree of polymerization n=2.4 by NMR spectrum.

Referential Example 3

Synthesis of Polyamide Oligomer (3)

In the same apparatus as used in Referential Example 1 was placed 150 ml of methylene chloride, in which were dissolved 0.030 mol of terephthaloyl chloride and 0.030 mol of isophthaloyl chloride at room temperature. A methylene chloride solution containing 0.048 mol of piperazine and 10 ml of triethylamine was added dropwise through the dropping funnel over 30 minutes at room temperature. The reaction was carried out at room temperature for 30 minutes. The reaction solution was added to 1 liter of n-hexane to precipitate oligomer and triethylamine hydrochloride. After filtration, thorough water washing, and vacuum drying, there was obtained polyamide oligomer (3).

This polyamide oligomer was found to have an average degree of polymerization $n=8$ by NMR spectrum.

Referential Example 4

Synthesis of Polyamide Oligomer (4)

In the same apparatus as used in Referential Example 1 was placed 150 ml of methylene chloride, in which were dissolved 0.012 mol of catechol, 0.048 mol of anhydrous piperazine, and 10 ml of triethylamine.

50 ml of methylene chloride solution containing 0.040 mol of isophthaloyl chloride and 0.020 mol of oxalyl chloride was added dropwise through the dropping funnel over 30 minutes with ice cooling. The reaction was carried out for 30 minutes in an ice bath. The methylene chloride was distilled away from the reaction liquid and the residue was washed thoroughly with water and dried in vacuo to give polyamide oligomer (4).

This polyamide oligomer was found to have an average degree of polymerization $n=3.4$ by NMR spectrum.

Referential Example 5

Synthesis of Polyamide Oligomer (5)

In the same apparatus as used in Referential Example 1 was placed 150 ml of methylene chloride, in which were dissolved 0.048 mol of anhydrous piperazine, 0.012 mol of phenol, and 10 ml of triethylamine. 50 ml of methylene chloride solution containing 0.060 mol of isophthaloyl chloride was added dropwise through the dropping funnel over 30 minutes at room temperature. The reaction was carried out at room temperature for 30 minutes. The reaction liquid was added to 1 liter of n-hexane to precipitate oligomer and triethylamine hydrochloride. After filtration, thorough water washing, and vacuum drying, there was obtained polyamide oligomer (5). This polyamide oligomer was found to have an average degree of polymerization $n=6.5$ by NMR spectrum.

Referential Example 6

Synthesis of Polyamide Oligomer (6)

In the same apparatus as used in Referential Example 1 was placed 150 ml of methylene chloride, in which were dissolved 0.048 mol of anhydrous piperazine, 0.012 mol of catechol, and 10 ml of triethylamine. The flask was cooled to 0° C. in an ice bath. 50 ml of methylene chloride solution containing 0.020 mol of isophthaloyl chloride, 0.020 mol of terephthaloyl chloride, and 0.020 mol of adipoyl chloride was added dropwise through the dropping funnel over 30 minutes with ice cooling. The reaction was carried out for 30 minutes with ice cooling.

The methylene chloride was distilled away from the reaction liquid, and the residue was washed with water and dried in vacuo to give polyamide oligomer (6). This polyamide oligomer was estimated to have an average degree of polymerization $n=3$ to 4 judging from the quantities of monomers charged, although a definite number was not determined by NMR spectrum.

Referential Example 7

Synthesis of Polyamide Oligomer (7)

In the same apparatus as used in Referential Example 1 was placed 150 ml of methylene chloride, in which were dissolved 0.048 mol of anhydrous piperazine, 0.012 mol of phenol, and 10 ml of triethylamine.

A methylene chloride solution containing 0.060 mol of orthophthaloyl chloride was added dropwise through the dropping funnel over 30 minutes at room temperature. The reaction was carried out at room temperature for 30 minutes.

The methylene chloride was distilled away from the reaction liquid, and the residue was washed with water and dried in vacuo to give polyamide oligomer (7). This polyamide oligomer was found to have an average degree of polymerization $n=3$ by NMR spectrum.

Referential Example 8

Synthesis of Polyamide Oligomer (8)

In the same apparatus as used in Referential Example 1 was placed 150 ml of methylene chloride, in which were dissolved 0.060 mol of adipoyl chloride. 50 ml of methylene chloride solution containing 0.048 mol of anhydrous piperazine and 10 ml of triethylamine was added dropwise through the dropping funnel over 30 minutes with ice cooling. The reaction was carried out of 30 minutes.

The methylene chloride was distilled away from the reaction liquid, and the residue was washed with water and dried in vacuo to give polyamide oligomer (8).

Referential Example 9

Synthesis of Polyamide Oligomer (9)

In the same apparatus as used in Referential Example 1 was placed 200 ml of methylene chloride, in which were dissolved 0.066 mol of o-tert-butylphenol, 0.100 mol of terephthaloyl chloride, and 10 ml of triethylamine at room temperature. The reaction was caused to proceed for 30 minutes. A methylene chloride solution containing 0.066 mol of anhydrous piperazine and 19 ml of triethylamine was added dropwise through the dropping funnel over 30 minutes. The reaction was caused to proceed at room temperature for 30 minutes. The resulting reaction solution was added to 2 liters of n-hexane to precipitate polyamide oligomer and triethylamine hydrochloride. After filtration, triethylamine hydrochloride was removed by thorough water washing, and the residue was dried in vacuo to give polyamide oligomer (9).

This polyamide oligomer was found to have an average degree of polymerization $n=2.7$ by proton NMR in which the absorption of phenyl proton adjacent to the carboxylic acid or carboxylic ester that appears in the neighborhood of $\delta=8.0$ ppm was compared with the absorption of other phenyl protons that appears in the region of $\delta=7.0$ ppm to $\delta=8.0$ ppm. Also, it was confirmed by NMR spectrum and IR spectrum that o-tert-butylphenol was connected to 67% of the terminals of the molecular chain of the polyamide oligomer.

Referential Example 10

Synthesis of Polyamide Oligomer (10)

In the same apparatus as used in Referential Example 1 was placed 200 ml of methylene chloride, in which were dissolved 0.050 mol of o-tert-butylphenol, 0.100 mol of terephthaloyl chloride, and 7.0 ml of triethylamine at room temperature. The reactants were stirred for 30 minutes. A methylene chloride solution containing 0.075 mol of anhydrous piperazine and 21 ml of triethylamine was added dropwise through the dropping funnel over 30 minutes. The reaction was carried out at room temperature for 30 minutes.

The resulting reaction liquid was added to 2 liters of n-hexane to precipitate polyamide oligomer and triethylamine hydrochloride. After filtration, thorough water washing, and vacuum drying, there was obtained polyamide oligomer (10).

The analysis by NMR spectrum indicated that o-tert-butylphenol was connected to 78% of the terminals of the molecular chain of the polyamide oligomer and the average degree of polymerization was n=3.6.

Referential Example 11

Synthesis of Polyamide Oligomer (11)

In the same apparatus as used in Referential Example 1 was placed 100 ml of methylene chloride, in which were dissolved 0.0333 mol of o-tert-butylphenol and 0.0500 mol of terephthaloyl chloride at room temperature. Then, 5.0 ml of triethylamine was added while cooling the solution at 0° C. in an ice bath. The reaction was carried out for 30 minutes.

A methylene chloride solution containing 0.0166 mol of anhydrous piperazine and 10 ml of triethylamine was added dropwise over 30 minutes while cooling the flask in an ice bath. The reaction was carried out for 30 minutes. The resulting reaction liquid was added to 1 liter of n-hexane. The precipitates were filtered, washed with water repeatedly, and dried in vacuo to give polyamide oligomer (11).

The analysis by NMR spectrum indicated that o-tert-butylphenol was connected to 50% of the terminals of the molecular chain of the polyamide oligomer and the average degree of polymerization was n=2.5.

Referential Example 12

Synthesis of bis-β-hydroxyethyl terephthalate (BHET)

In a 500 ml three-neck flask were placed 204 g of dimethyl terephthalate, 150 g of ethylene glycol, and 0.33 g of calcium acetate. The reaction was carried out at 180° C. under a nitrogen stream for 4 hours to give BHET.

EXAMPLES

EXAMPLE 1

In a 200-ml three-neck flask equipped with a nitrogen gas inlet, air condenser, and stirrer were placed 38 g of BHET prepared in Referential Example 12, 4 mg of triphenyl phosphate, and 10 mg of antimony trioxide. The reactants were heated at 220° C. under a nitrogen stream using an oil bath so the BHET was melted. The powdery polyamide oligomer (1) was added in an amount shown in Table 1, with stirring for 10 minutes. The oligomer was dissolved in BHET and the reactants became a colorless transparent melt. The reaction system was evacuated slowly to 5 mmHg while keeping the oil bath at 220° C. Then, the oil bath was heated to 280° C. and the reaction system was evacuated to 0.5 mmHg. Under this condition, polymerization was carried out for 2 hours to give the copolyesteramide.

The intrinsic viscosity [η] of this copolyesteramide measured in phenol/tetrachloroethane (1:1 by volume) at 25° C. is shown Table 1.

The copolyesteramide was made into a 0.3 mm thick quenched film. A test piece, 5 mm wide and 80 mm long (gauge distance 25 mm), was cut out of the film. This test piece was stretched on a tensile testing machine (Tensilon UTM-III-500, manufactured by Toyo Boldwin) equipped with a constant temperature chamber, at 75° C. and a pulling rate of 25 mm/min. Thus, there was obtained a stretched tape having a draw ratio (λ) of 4.0.

This stretch tape was measured for initial modulus, breaking strength, and elongation at break using the above-mentioned tensile testing machine with a gauge distance of 25 mm and at a pulling rate of 25 mm/min, at room temperature. The results are shown in Table 1, in which Runs 1 and 2 indicate Comparative Examples and Runs 3 to 5, Working Examples. The quantity of oligomer added is expressed in terms of wt% in the polyester obtained after complete condensation of BHET.

TABLE 1

| Run | Quantity of oligomer (1) added (wt %) | [η] (dl/g) | Initial modulus (kg/mm²) | Breaking strength (kg/mm²) | Elongation at break (%) |
|---|---|---|---|---|---|
| 1 | 0 | 0.74 | 643 | 27.8 | 72 |
| 2 | 0.01 | 0.92 | 685 | 29.4 | 76 |
| 3 | 0.1 | 0.85 | 800 | 30.2 | 107 |
| 4 | 0.5 | 0.89 | 827 | 31.3 | 65 |
| 5 | 10.0 | 0.56 | 843 | 18.2 | 35 |

In order to confirm that the resulting polymer is a copolymer of polyester and polyamide, the following experiment was carried out. 0.20 g each of the polymers obtained in Run 1 and Run 5 was dissolved in 20 ml of mixed solvent of phenol/tetrachloroethane. About 19 ml of n-heptane was added to this solution until the solution became apparently cloudy. The solution was then centrifuged to separate it into two layers. The lower layer was collected and poured into a large amount of methanol to precipitate the polymer. After filtration and drying, the polymer was subjected to infrared spectrometry. For comparison, 0.18 g of the polymer obtained in Run 1 and 0.020 g of polyamide oligomer (1) were dissolved in a mixed solvent of phenol/tetrachloroethane. The resulting solution was treated in the same way as above, and the separated polymer was subjected to infrared spectroscopy.

Figure 2:
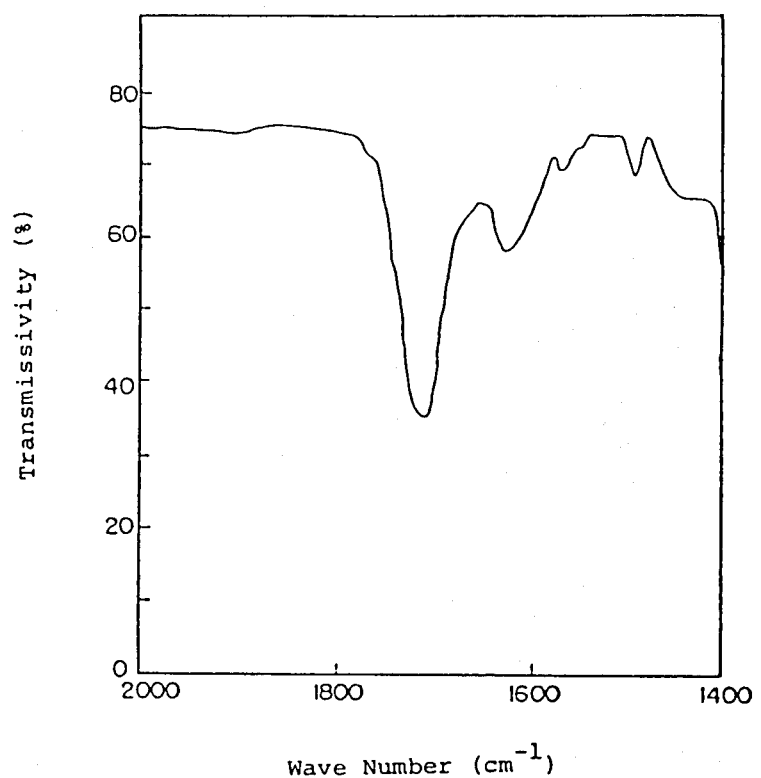
FIG. 2 is an infrared spectrum of the polymer obtained in Run 5 of Example 1.
Figure 3:
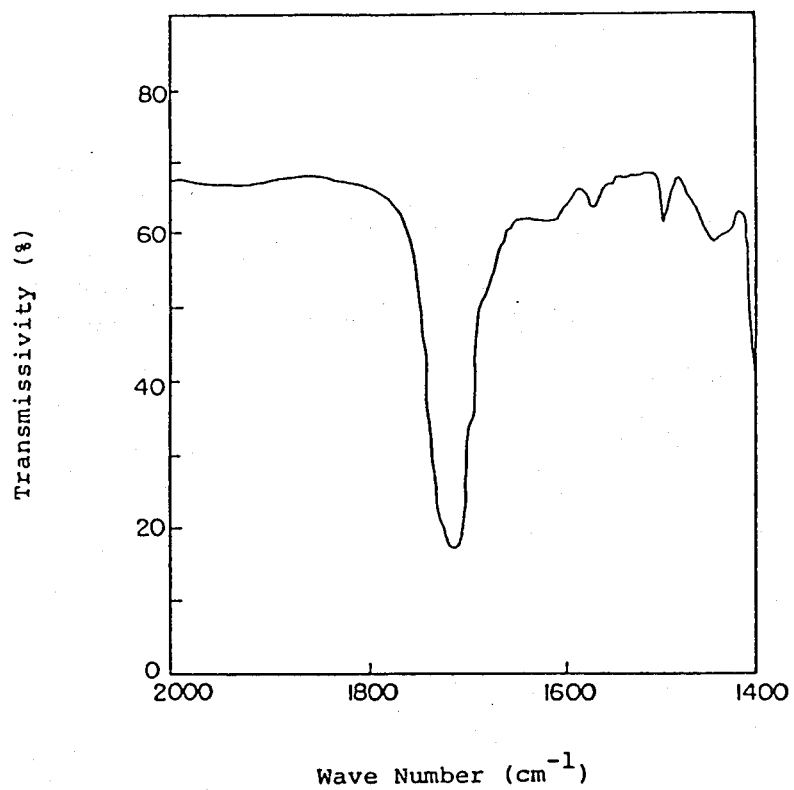
FIG. 3 is an infrared spectrum of the mixture of the polymer obtained in Run 1 of Example 1 and polyamide oligomer (1) used in Example 1.

FIGS. 1 to 3 show the infrared absorption spectrums of the polymer (polyethylene terephthalate) obtained in Run 1, the polymer obtained in Run 5, and a mixture of the polymer obtained in Run 1 and polyamide oligomer (1), respectively. It is to be noted that absorption due to C=O stretching vibration of piperazine amide is observed at 1630 cm$^{-1}$ in FIG. 2, whereas such absorption is not observed in FIG. 1 and FIG. 3. Thus, it was confirmed that the polymer prepared by reacting polyamide oligomer with BHET contains copolymerized polyamide.

The following table shows the content of polyamide block calculated based on the nitrogen content determined by elemental analysis, and also shows the melting point of the polymer. The melting point is the crystalline melting endothermic peak temperature measured by heating the amorphous sample at a rate of 20° C./min on a differential scanning calorimeter.

| Run | Content of polyamide block (wt %) | Melting point (°C.) |
| --- | --- | --- |
| 1 | — | 254 |
| 2 | 0.010 | 253 |
| 3 | 0.11 | 254 |
| 4 | 0.49 | 255 |
| 5 | 9.1 | 254 |

The polymer was melted at 280° C. and the melt was observed under an optical microscope of 200 magnifications. In the case of the polymer obtained in Run 1, the phase-separated configuration was not observed; in the case of the polymers obtained in Runs 2 to 4, the fine grainy phase-separated configuration was observed; and in the case of the polymer obtained in Run 5, the complex phase-separated configuration was observed. These observation results indicate that the resulting polymer was a block copolymer. In addition, the fact that the melting point of the polymer does not fall at all evenly when the content of the polyamide block increases suggests that the resulting polymer is a block copolymer.

EXAMPLE 2

Several kinds of copolyesteramides were prepared in the same way as in Example 1 from polyamide oligomer (2), (3), (4), (5), (6), and (7) prepared in Referential Examples 2 to 7, as shown in Table 2. The oligomers were all soluble in hot BHET at 220° C., and transparent melts were obtained.

Table 2 shows the intrinsic viscosity $[\eta]$ of the resulting copolyesteramide and the tensile properties of the stretched tape (draw ratio of 4) produced in the same way as in Example 1.

It is noted that the stretched tape is improved (about 1.3 times higher) in initial modulus as compared with a stretched tape of polyethylene terephthalate film stretched under the same conditions.

TABLE 2

| Run | Type of oligomer | Quantity added (wt %) | $[\eta]$ (dl/g) | Initial modulus (kg/mm$^2$) | Breaking strength (kg/mm$^2$) | Elongation at break (%) |
| --- | --- | --- | --- | --- | --- | --- |
| 6 | Oligomer (2) | 10.0 | 0.59 | 831 | 24.5 | 46 |
| 7 | Oligomer (3) | 0.5 | 0.79 | 893 | 32.7 | 76 |
| 8 | Oligomer (4) | 2.0 | 0.64 | 849 | 29.1 | 70 |
| 9 | Oligomer (5) | 0.5 | 0.72 | 791 | 33.0 | 75 |
| 10 | Oligomer (6) | 0.5 | 0.77 | 852 | 31.4 | 76 |
| 11 | Oligomer (7) | 0.5 | 0.84 | 867 | 33.5 | 79 |

The copolymers obtained in this example were treated as in Example 1 and subjected to infrared spectrometry. Absorption at 1630 cm$^{-1}$ was observed. The copolymers were found to have melting points as follows:

| Run | Melting point |
| --- | --- |
| 6 | 254° C. |
| 7 | 255 |
| 8 | 254 |
| 9 | 254 |
| 10 | 254 |

-continued

| Run | Melting point |
| --- | --- |
| 11 | 255 |

Comparative Example 1

0.01 g of polyamide oligomer (8) prepared in Referential Example 8 was added to 1 g of molten BHET at 220° C., with stirring for 10 minutes. The oligomer did not dissolve and the mixture remained cloudy.

The oligomer (8) in which the dicarboxylic acid component was composed of adipic acid alone was not readily copolymerized with polyester.

Comparative Example 2

38 g of BHET was placed in the same apparatus as used in Example 1 and heated to 280° C. under a stream of nitrogen gas. 1.07 g of terephthalic acid was added, and then 4 mg of triphenyl phosphate and 10 mg of antimony trioxide were added. After cooling to 240° C., 0.55 g of piperazine was added. After heating again to 280° C., polymerization was carried out for 2 hours under a vacuum lower than 0.5 mmHg. There was obtained a brown black copolymer, which was found to contain 1.2 mol% of piperazine units according to NMR spectrum.

Judging from the synthesis method, it is considered that the piperazine unit in the copolymer is connected to terephthalic acid through an amide bond to form a monomer which is connected to the polyethylene terephthalate molecular chains. The content of the piperazine terephthalamide monomer was calculated at 3.0 wt%. Table 3 shows the intrinsic viscosity $[\eta]$ of this copolymer and the tensile properties of the stretched tape (draw ratio of 4) determined in the same way as in Example 1. It is to be noted that the stretched tape of the copolymer has almost the same initial modulus as the stretched tape of polyethylene terephthalate (Example 1, Run 1).

TABLE 3

| Sample | $[\eta]$ (dl/g) | Initial modulus (kg/mm$^2$) | Breaking strength (kg/mm$^2$) | Elongation at break (%) |
| --- | --- | --- | --- | --- |
| Polyethylene terephthalate | 0.74 | 643 | 27.8 | 72 |
| Copolymer of Comparative Example 2 | 0.72 | 680 | 22.1 | 53 |

The resulting copolymer was found to have a melting point of 252° C. In other words, the random copolymer in which the amide units are not repeated consecutively has a lower melting point as compared with the copolymer of this invention obtained in Example 1. This demonstrates that the copolymer obtained in Example 1 is a block copolymer. The melt of the copolymer obtained in this Comparative Example was examined under a microscope, and the phase-separated configuration was not observed.

EXAMPLE 3

In the same apparatus as used in Example 1 were placed 38 g of bis-$\beta$-hydroxybutyl terephthalate (BHBT), 4 mg of triphenyl phosphate, and 10 mg of tetrabutyl titanate. (The BHBT was prepared in the same way as in Referential Example 12, except that ethylene glycol was replaced by 1,4-butane diol.) The apparatus was heated to 220° C. in an oil bath to melt BHBT. 0.5 wt% of polyamide oligomer (1) was added, with stirring for 10 minutes. The oligomer was dissolved completely and a colorless transparent melt was obtained. The reaction system was evacuated slowly to 5 mmHg while keeping the oil bath temperature at 220° C. The oil bath was then heated again to 250° C., and polymerization was carried out for 2 hours under a vacuum lower than 0.5 mmHg to give a copolyesteramide. The resulting copolymer was found to have an intrinsic viscosity [η] of 0.82 dl/g and a melting point of 225° C. On microscopic examination of the copolymer melt, the phase-separated configuration was observed.

EXAMPLE 4

Several kinds of copolyesteramides were prepared in the same way as in Example 1 from polyamide oligomer (9) prepared in Referential Example 9, as shown in Table 4. The oligomers were all soluble in hot BHET at 220° C., and transparent melts were obtained.

Table 4 also shows the intrinsic viscosity [η] of the resulting copolyesteramide and the tensile properties of the stretched tape (draw ratio of 4) determined in the same way as in Example 1. For comparison, the values of polyethylene terephthalate (Run 1) are also shown.

TABLE 4

| Run | Quantity of oligomer added (wt %) | [η] (dl/g) | Initial modulus (kg/mm$^2$) | Breaking strength (kg/mm$^2$) | Elongation at break (%) |
|---|---|---|---|---|---|
| 1 | 0 | 0.74 | 643 | 27.8 | 72 |
| 12 | 0.01 | 0.82 | 674 | 28.5 | 75 |
| 13 | 0.1 | 0.88 | 812 | 31.6 | 95 |
| 14 | 0.5 | 0.83 | 830 | 32.2 | 62 |
| 15 | 10.0 | 0.60 | 848 | 20.1 | 38 |

In order to confirm that the resulting polymer was a copolymer of polyester and polyamide, the following experiment was carried out. 0.20 g of the polymer obtained in Run 15 was dissolved in 20 ml of mixed solvent of phenol/tetrachloroethane. About 19 ml of n-heptane was added to this solution until the solution became apparently cloudy. The solution was then centrifuged to separate it into two layers. The lower layer was collected and poured into a large amount of methanol to precipitate the polymer. After filtration and drying, the polymer was subjected to infrared spectrometry. For comparison, 0.18 g of polyethylene terephthalate obtained in Run 1 and 0.020 g of polyamide oligomer (9) were dissolved in 20 ml of mixed solvent of phenol/tetrachloroethane. The resulting solution was treated in the same way as above, and the separated polymer was subjected to infrared spectroscopy.

Figure 4:
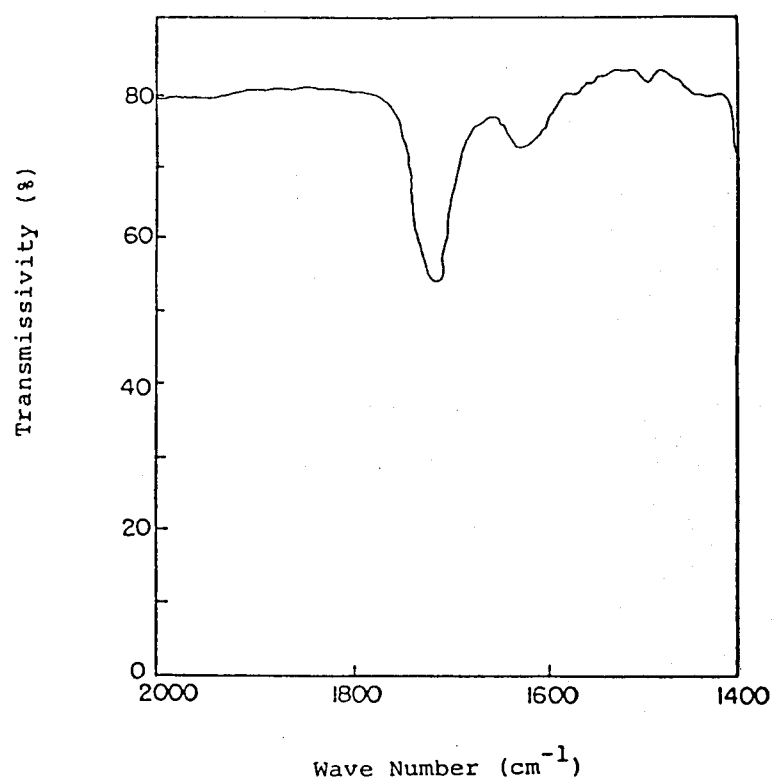
FIG. 4 is an infrared spectrum of the polymer obtained in Run 15 of Example 4.
Figure 5:
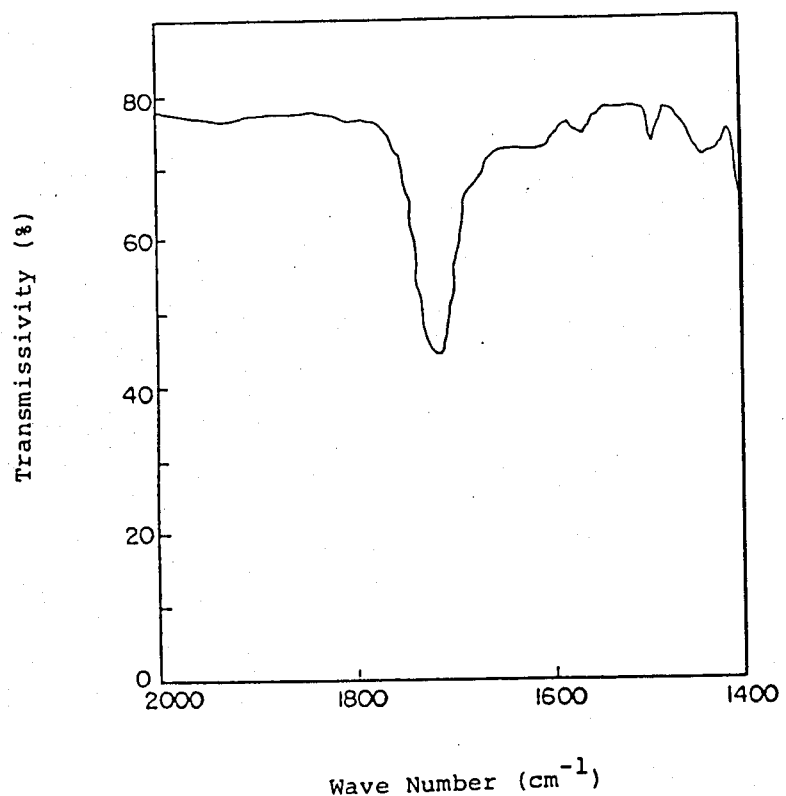
FIG. 5 is an infrared spectrum of the mixture of polyethylene terephthalate and polyamide oligomer (9).

FIGS. 4 and 5 show the infrared absorption spectrums of the polymer obtained in Run 15 and the mixture of the polymer obtained in Run 1 and polyamide oligomer (9), respectively. It is to be noted that absorption due to C=O stretching vibration of piperazine amide is observed at 1630 cm$^{-1}$ in FIG. 4, whereas such absorption is not observed in FIG. 5. Thus, it was confirmed that the polymer prepared by reacting polyamide oligomer with BHET contains copolymerized polyamide.

The following table shows the content of polyamide block calculated based on the nitrogen content determined by elemental analysis, and also shows the melting point of the polymer.

| Run | Content of polyamide block (wt %) | Melting point (°C.) |
|---|---|---|
| 12 | 0.011 | 255 |
| 13 | 0.098 | 254 |
| 14 | 0.48 | 254 |
| 15 | 9.0 | 255 |

The polymer was melted at 280° C. and the melt was examined under an optical microscope of 200 magnifications. In the case of the polymers obtained in Run 12 to 14, the fine grainy phase-separated configuration was observed; but in the case of the polymer obtained in Run 15, the complex phase-separated configuration was observed. These observation results indicate that the resulting polymer was a block copolymer. In addition, the fact that the melting point of the polymer does not fall at all evenly when the content of the polyamide block increases suggests that the resulting polymer is a block copolymer.

EXAMPLE 5

Several kinds of copolyesteramides were prepared in the same way as in Example 1 from polyamide oligomers (10) and (11) prepared in Referential Examples 10 and 11, as shown in Table 5. The oligomers were all soluble in hot BHET at 220° C., and transparent melts were obtained.

Table 5 also shows the intrinsic viscosity [η] of the resulting copolyesteramide and the tensile properties of the stretched tape (draw ratio of 4) determined in the same way as in Example 1.

It is to be noted that the stretched tape is improved (about 1.3 times higher) in initial modulus as compared with a stretched tape of polyethylene terephthalate film stretched under the same conditions.

TABLE 5

| Run | Type of oligomer | Quantity added (wt %) | [η] (dl/g) | Initial modulus (kg/mm$^2$) | Breaking strength (kg/mm$^2$) | Elongation at break (%) |
|---|---|---|---|---|---|---|
| 16 | Oligomer (10) | 2.0 | 0.65 | 825 | 30.2 | 72 |
| 17 | Oligomer (11) | 0.5 | 0.77 | 855 | 31.5 | 76 |

The copolymers obtained in this example were treated as in Example 1 and subjected to infrared spectrometry. Absorption at 1630 cm$^{-1}$ was observed. The copolymers were found to have a melting point of 254° C.

EXAMPLE 6

In the same apparatus as used in Example 1 were placed 38 g of bis-β-hydroxybutyl terephthalate (BHBT), 4 mg of triphenyl phosphate, and 10 mg of tetrabutyl titanate. (The BHBT was prepared in the same way as in Referential Example 12, except that ethylene glycol was replaced by 1,4-butane diol.) The apparatus was heated to 220° C. in an oil bath to melt BHBT. 0.5 wt% of polyamide oligomer (9) was added, with stirring for 10 minutes. The oligomer was dissolved completely and a colorless transparent melt was obtained. The reaction system was evacuated slowly to 5 mmHg while keeping the oil bath temperature at 220° C. The oil bath was then heated again to 250° C., and polymerization was carried out for 2 hours under a vacuum lower than 0.5 mmHg to give a copolyesteramide. The resulting copolymer was found to have an intrinsic viscosity [η] of 0.78 dl/g and a melting point of 224° C. On microscopic examination of the copolymer melt, the phase-separated configuration was observed.

EXAMPLE 7

In a 200-ml flask were placed 80 g of polyethylene terephthalate having an intrinsic viscosity [η]=0.74 and 20 g of the copolymer obtained in Run 4 in Example 1. The reactants were heated to 280° C. under a nitrogen atmosphere. After the polymer had melted, the reactants were stirred to give a resin composition of polyethylene terephthalate and the copolymer of this invention. Since the copolymer obtained in Run 4 contains 0.49 wt% of polyamide block, the resulting resin composition is considered to contain about 0.1 wt% of polyamide block.

This resin composition was made into a stretched tape in the same way as in Example 1. The stretched tape was found to have an initial modulus of 810 kg/mm² and an elongation at break of 73%. The intrinsic viscosity [η] was 0.71. The initial modulus is comparable to that obtained in Run 3 as shown in Table 1; it is plainly higher than that in the case of polyethylene terephthalate alone (Run 1). This indicates that the copolymers of this invention can be mixed with polyalkylene terephthalate without impairing the effect of the invention.

EXAMPLE 8

In 300 ml of methylene choride were dissolved 0.096 mol of anhydrous trans-2,5-dimethyl piperazine, 0.024 mol of phenol, and 20 ml of triethylamine. To this solution were added dropwise 0.060 mol of terephthaloyl chloride and 100 ml of methylene chloride solution containing 0.060 mol of isophthaloyl chloride over 30 minutes at room temperature. The reacton was carried out for 30 minutes at room temperature. The methylene chloride was distilled away from the reaction liquid, and the residue was washed thoroughly with water and dried in vacuo. Thus, there was obtained polyamide oligomer of the following formula.

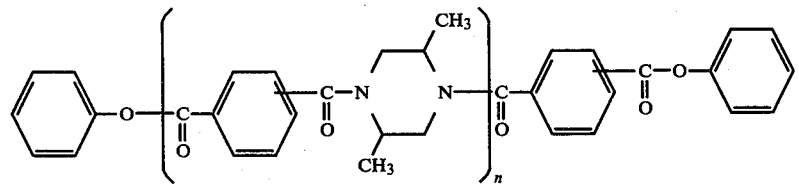

The resulting oligomer was found to have an average degree of polymerization of 2.4 according to NMR spectrum.

0.5 part of this polyamide oligomer was added to the melt of 100 parts of BHET, 0.01 part of triphenyl phosphate, and 0.025 part of antimony trioxide at 220° C., followed by stirring for 10 minutes. The reaction system was evacuated slowly and at the same time heated to 280° C. Under a vacuum of 0.5 mmHg, or lower, polymerization was carried out for 2 hours. Thus, there was obtained a copolyesteramide having an intrinsic viscosity of 0.85 dl/g (measured in an equivolume mixed solvent of phenol and tetrachloroethane at 25° C.).

Using a hot press heated to 280° C., the copolyesteramide pellets were pressed against a 0.1 mm thick steel plate polished with sandpaper and washed with acetone. After quenching with ice water, a 50-micron thick amorphous polymer film was formed on the steel plate.

The film exhibited good adhesion and high surface hardness equivalent to that of polyethylene terephthalate. The coated steel plate was bent 90° and 180° at room temperature, and the change of the film was examined under a reflecting microscope. No change was observed at all in the film.

Polyethylene terephthalate was coated on the steel plate in the same way and the coated steel plate was bent 90° and 180°. A large number of cracks, several tens of microns in length, occurred along the bend.

EXAMPLE 9

In a 1-liter flask was placed 500 ml of methylene chloride, and in this methylene chloride were dissolved 0.48 mol of anhydrous piperazine, 0.12 mol of catechol, and 100 ml of triethylamine at room temperature. To this solution were added dropwise 0.30 mol of terephthaloyl chloride and 150 ml of methylene chloride solution containing 0.30 mol of isophthaloyl chloride. The reaction was carried out for 30 minutes at room temperature. The methylene chloride was distilled away from the reaction liquid, and the residue was washed thoroughly with water and dried in vacuo. Thus, there was obtained a polyamide oligomer having an average degree of polymerization of 3.2.

In a 50-liter reactor were placed 20 kg of dimethyl terephthalate, 16 kg of ethylene glycol, and 16 g of calcium acetate. Reaction was carried out at 200° C. for 4 hours under a stream of nitrogen gas. Then, 16 ml of tributyl phosphate, 30 g of antimony trioxide, and 100 g of the polyamide oligomer obtained as above mentioned were added with stirring for 10 minutes. The reaction system was heated to 260° C. and evacuated slowly. After heating to 280° C. slowly, polymerization was carried out under a vacuum of 0.5 mmHg or lower for 2 hours. Thus, there was obtained a copolyesteramide having an intrinsic viscosity of 0.69 dl/g.

The resulting copolymer was subjected to melt spinning at 290° C. at a rate of 500 m/min. Thus, there was obtained yarn having [η]=0.59 dl/g. This yarn was stretched 6.3 times at 75° C. and 150° C. using a heat plate, and the physical properties of the stretched yarn were measured. The results are shown in Table 6. For the purpose of comparison, polyethylene terephthalate having [η]=0.64 dl/g was spun and stretched under the same conditions. The physical properties of the stretched yarn are also shown in Table 6.

TABLE 6

| | Physical Properties of Stretched Yarn | | | |
| --- | --- | --- | --- | --- |
| | [η] (dl/g) | Young's modulus (g/d) | Breaking strength (g/d) | Elongation at break (%) |
| Copolyesteramide | 0.59 | 180 | 7.7 | 6.5 |
| Polyethylene | 0.61 | 164 | 7.6 | 6.1 |

TABLE 6-continued

| | Physical Properties of Stretched Yarn | | |
|---|---|---|---|
| [η] (dl/g) | Young's modulus (g/d) | Breaking strength (g/d) | Elongation at break (%) |
| terephthalate | | | |

What is claimed is:

1. A random block copolyesteramide comprising 0.05 to 20 wt% of polyamide blocks composed of amide units represented by the formula (I)

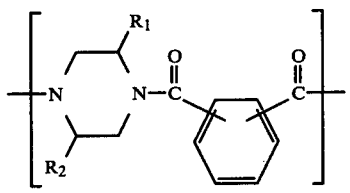

(where $R_1$ and $R_2$ are hydrogen or a methyl group) and 99.95 to 80 wt% of polyester blocks composed of ester units represented by the formula (II)

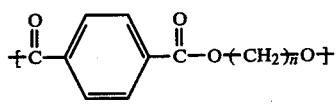

(where n is an integer of 2 to 4), said copolyesteramide having an intrinsic viscosity higher than 0.5, and the average number of the consecutive repeating amide units in said polyamide blocks being 2 to 40.

2. A copolymer as set forth in claim 1, wherein at least 30 mol% of the dicarboxylic acid residues of the polyamide blocks are isophthalic acid and/or orthophthalic acid residues.

3. A copolymer as set forth in claim 1, wherein the dicarboxylic acid residues of the polyamide blocks are terephthalic acid residues.

4. A copolymer as set forth in claim 3, wherein the average number of consecutive repeating amide units in the polyamide blocks is 2 to 5.

5. A copolymer as set forth in claim 1, wherein more than 30 mol% of the dicarboxylic acid residues of the polyamide blocks are isophthalic acid residues and the balance are terephthalic acid residues.

6. A copolymer as set forth in claim 1, wherein the polyamide blocks contribute 0.1 to 5 wt.% of the weight of the copolymer.

7. A copolymer as set forth in claim 1, wherein the polyamide blocks contribute 0.2 to 2 wt% of the weight of the copolymer.

8. A copolymer as set forth in claim 1, wherein the diamine residues of the polyamide blocks are piperazine residues.

9. A copolymer as set forth in claim 1, wherein the diamine residues of the polyamide blocks are dimethylpiperazine residues.

10. A copolymer as set forth in claim 1, wherein the n of the diol residues of the polyester blocks is 2.

11. A process for producing a copolyesteramide which comprises dissolving a polyamide oligomer having the repeating unit represented by the formula (I) and having an average degree of polymerization of 2 to 40,

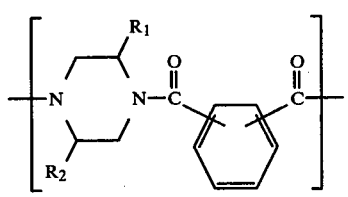

(where $R_1$ and $R_2$ are hydrogen or a methyl group) in a polyester monomer or a prepolymer thereof represented by the formula (III),

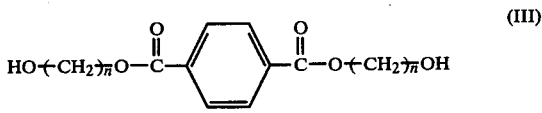

(where n is an integer of 2 to 4) and subsequently performing a polycondensation reaction.

12. A process for producing a copolymer as set forth in claim 11, wherein at least 30 mol% of the dicarboxylic acid residues of the polyamide oligomer are isophthalic acid and/or orthophthalic acid residues.

13. A process for producing a copolymer as set forth in claim 11, wherein the dicarboxylic acid residues of the polyamide oligomer are terephthalic acid residues.

14. A process for producing a copolymer as set forth in claim 13, wherein the polyamide oligomer is one in which at least 50% of the terminals of the molecular chains have phenol derivative residues represented by the formula (IV)

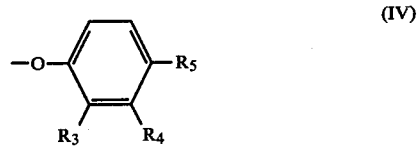

(where either of $R_3$ or $R_4$ is an alkyl group of carbon number 3 to 5 and the other is hydrogen; and $R_5$ is hydrogen, a lower alkyl group, or a lower alkoxy group).

15. A process for producing a copolymer as set forth in claim 14, wherein the polyamide oligomer has an average degree of polymerization of 2 to 5.

16. A process for producing a copolymer as set forth in claim 14, wherein $R_3$ is a tert-butyl group, and $R_4$ and $R_5$ are hydrogen.

17. A process for producing a copolymer as set forth in claim 11, wherein more than 30 mol% of the dicarboxylic acid residues of the polyamide oligomer are isophthalic acid residues and the balance are terephthalic acid residues.

18. A resin composition which comprises a polyalkylene terephthalate and a copolyesteramide as set forth in claim 1.

19. A resin composition as set forth in claim 18, wherein the copolyesteramide is blended in such an amount that the polyamide blocks of the copolyesteramide contribute 0.05 to 20 wt% of the total weight of the resin.

20. A fiber produced from the copolyesteramide set forth in claim 1.

21. A fiber produced from the resin composition set forth in claim 18.

22. A film produced from the copolyesteramide set forth in claim 1.

23. A film produced from the resin composition set forth in claim 18.

24. A coating material comprising the copolyesteramide set forth in claim 1.

25. A coating material comprising the resin composition set forth in claim 18.

* * * * *